United States Patent
Yoo et al.

(10) Patent No.: US 9,805,830 B2
(45) Date of Patent: Oct. 31, 2017

(54) GENERATING NEUTRON

(71) Applicant: Korea Basic Science Institute, Daejeon (KR)

(72) Inventors: Suk Jae Yoo, Daejeon (KR); Seong Bong Kim, Goonsan (KR); Jung-sik Yoon, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 341 days.

(21) Appl. No.: 14/389,385

(22) PCT Filed: Apr. 1, 2013

(86) PCT No.: PCT/KR2013/002667
§ 371 (c)(1),
(2) Date: Sep. 30, 2014

(87) PCT Pub. No.: WO2013/151284
PCT Pub. Date: Oct. 10, 2013

(65) Prior Publication Data
US 2015/0063518 A1    Mar. 5, 2015

(30) Foreign Application Priority Data

Apr. 2, 2012  (KR) .......... 10-2012-0033751

(51) Int. Cl.
*G21B 1/05* (2006.01)
*G21G 4/02* (2006.01)
*H05H 3/06* (2006.01)

(52) U.S. Cl.
CPC .......... *G21B 1/05* (2013.01); *G21G 4/02* (2013.01); *H05H 3/06* (2013.01)

(58) Field of Classification Search
CPC .......... G21B 1/05; G21G 4/02; H05H 3/06
(Continued)

(56) References Cited

U.S. PATENT DOCUMENTS 3,170,841 A * 2/1965 Post .......... H05H 1/14
                                          376/123
6,141,395 A   10/2000 Nishimura et al.
2016/0155517 A1* 6/2016 Wong .......... G21B 1/11
                                          376/112

FOREIGN PATENT DOCUMENTS

| JP | 2000-162390 A | 6/2000 |
| JP | 2004-132718 A | 4/2004 |
| JP | 2008-202942 A | 9/2008 |

* cited by examiner

*Primary Examiner* — Jack W Keith
*Assistant Examiner* — Daniel Wasil
(74) *Attorney, Agent, or Firm* — Patent Office of Dr. Chung Park (57) ABSTRACT

The present invention provides a neutron generating device for generating a high neutron flux by forming plasma in the vicinity of a target and by accelerating electrons and charged particles in the plasma toward the target. Magnetic field is formed in the vicinity of the target and a microwave generator irradiates microwaves into the space where the magnetic field is generated to thereby generate plasma in the space. The accelerated electrons and charged particles collide with the target to generate neutron flux. Also, to prevent the target surface from being excessively heated, the plasma is generated in a pulsed mode and target voltage is applied in a pulsed mode. To secure a continuous process, the level of target bias voltage for the target is adjusted so that the target re-adsorbs elements when the elements adsorbed on the target are depleted.

17 Claims, 5 Drawing Sheets

(58) Field of Classification Search
USPC .................. 376/108, 111, 114, 121, 123
See application file for complete search history.

GENERATING NEUTRON

CROSS-REFERENCE TO PRIOR APPLICATIONS

This application is a national Stage Patent Application of PCT International Patent Application No. PCT/KR2013/002667, filed on Apr. 1, 2013 under 35 U.S.C. §371, which claims priority of Korean Patent Application No. 10-2012-0033751, filed on Apr. 2, 2012, which are all hereby incorporated by reference in their entirety.

TECHNICAL FIELD

The present invention relates to a neutron generating source, and more particularly, to a high neutron flux generating device utilizing electron cyclotron resonance (ECR) plasma.

BACKGROUND ART

Neutrons are widely utilized in order to detect nuclear materials, explore oil layers, research the structure of materials and study medicine. Accordingly, a generating source for the neutron has been researched and developed as necessary.

A neutron may be obtained basically by causing a nuclear fusion reaction expressed as follows:

$D^+ + D^+ \rightarrow n + \mathrm{He}^3$ or $D^+ + T^+ \rightarrow n + \mathrm{He}$ There have been, inter alia, trials to generate neutrons in a high flux by nuclear fusion reaction utilizing plasma. Japan Patent Laid-Open Publication No. 2008-202942 also discloses a nuclear fusion reaction using plasma, but adopts a configuration that separately installs a space for plasma generation outside a space for the nuclear fusion reaction and sets an ion extraction electrode in a space which the nuclear fusion takes place in, which makes an equipment complicated and lowers the efficiency of nuclear fusion.

Meanwhile, there is a method to produce a neutron flux by causing a target on which substances such as deuterium are adsorbed to be collided utilizing plasma generated from an RF (radio frequency) ICP (inductively coupled plasma) plasma source. In this method, to produce a high neutron flux, ions accelerated and extracted by plasma sheath generated between plasma and target are caused to collide with the target, instead causing the ion to collide with the target by extracting the ions from the conventional ion sources.

The above-described method, however, poses a few problems as follows.

When the target is immersed in RF ICP plasma, the temperature in the target surface is drastically heated by collision with the ions and electrons in the plasma, which leads a considerable evaporation of reactant elements adsorbed on the metallic surface of the target. For instance, in a case in which heavy hydrogen is absorbed on a Ti target, it commences evaporation at 200° C., which brings down the probability of nuclear fusion, thereby lowering the neutron flux. To deal with such a problem, installing an additional cooling unit for the target may be considered but it may not extend significantly the target life.

Another problem is that the magnetic field generated in the vicinity of the target may cause the reverse effect to the original intension. A magnetic field generated in the vicinity of the target, for example, prohibits the ions in the RF ICP plasma from diffusing to the vicinity of the target, which rather lowers the density of the plasma in the vicinity of the target and lowers the ion flux that collides with the target thereby lowering the neutron flux. In other words, the generated plasma itself may not approach the target that is inside the magnetic field due to the effect of the magnetic field. Accordingly, the neutron generating source having such a structure may not produce a high neutron flux.

In addition, the conventional neutron or gamma ray generating sources, which utilize the nuclear fusion reaction by causing the ions to collide with the target, use the target on which the reactant elements are adsorbed from outside. However, when such a target is used for a neutron or gamma ray generating source, since the target has a relatively short life, it is necessary to continuously supply the targets from the outside. Accordingly, the conventional neutron or gamma ray generating source is hardly operated continuously for long time.

DISCLOSURE OF INVENTION TECHNICAL GOALS

In order to solve the issues described above, an object of the present invention is to provide a method which generates a high density of plasma in the vicinity of a target and produces a high neutron flux by extracting a high ion flux to collide with a target by using plasma sheath produced between the plasma and the target, and further to provide, by preventing a target surface from being excessively heated to minimize evaporation of nuclear fusion reactant elements, a neutron generating source capable of generating a high neutron flux.

Another object of the present invention is to provide a neutron generating source appropriate for each application field in that it may unrestrictedly adjust shapes of plasma and target into a plate, cylinder, line, or the like, and a neutron generating source that may also act as a gamma ray generating source depending on the target material that may be selected unrestrictedly.

Yet another object of the present invention is to provide a method to adsorb nuclear fusion reactant elements on a target inside the neutron or gamma ray generating source itself in order for continuous use of the target on which the nuclear fusion reactant elements are adsorbed, which enables a long-time, and continuous operation without target replacement.

Still another object of the present invention is to allow gases containing nuclear fusion reactant elements to flow in the target in order for continuous use of the target on which the nuclear fusion reactant elements are adsorbed, which enables re-use of the target.

Technical Solutions

To achieve the above-described objects, according to an aspect of the present invention, there is provided a method to generate a magnetic field in the vicinity of a target, generate plasma in a high density inside a space, in which the magnetic field has been generated and in the vicinity of the target, and emit a high neutron flux from the target by extracting a high ion flux by using plasma sheath generated between the plasma and the target. There is also provided, according to an aspect of the present invention, a method to produce plasma and target voltage either in the continuous or pulsed mode, which realizes a various ways of operation by combining the modes including continuous plasma plus continuous target voltage, continuous plasma plus pulsed target voltage, pulsed plasma plus continuous target voltage, or pulsed plasma plus pulsed target voltage. The operation manner that combines pulsed plasma with pulsed target voltage, particularly, is advantageous in that it may prevent the target from being excessively heated. In addition, lowering the bias voltage that is to be applied to a target allows a continuous operation without target replacement because the ions of nuclear fusion reactant elements collide with the target in the high-density plasma in the vicinity of the target, which facilitates the diffusion and adsorption of the ions into the target.

According to an aspect of the present invention, a neutron or gamma ray generating source may be provided including a plasma generating chamber; targets, which are mounted inside the chamber, onto which neutron or gamma ray generating elements have been adsorbed; a magnet structure, installed around the target, which generates a magnetic field around the target; a microwave generator that irradiates microwaves into a space, to produce plasma, in which the magnetic field has been generated; and a power supply that applies voltage to the target.

According to another aspect of the present invention, the neutron or gamma ray generating source aforementioned may be provided, wherein the target voltage applied in a pulsed manner.

According to yet another aspect of the present invention, the neutron or gamma ray generating source aforementioned may be provided, wherein the target is constructed as a plate while the magnet structure includes an array of multiple magnets mounted on an upper side of the target to produce bridge-type magnetic field lines with the target as its center.

According to a further aspect of the present invention, the neutron or gamma ray generating source aforementioned may be provided, wherein the target is constructed as a cylinder while the magnet structure is formed as coupled cylinders or rings that surround a part of the target from the outside of the target to produce bridge-type magnetic field lines with the target as its center.

According to a further aspect of the present invention, the neutron or gamma ray generating source aforementioned may be provided, wherein the magnet structure is formed as coupled cylinders or rings while the target is aligned as a line or plate along the central axis of the magnet structure to produce bridge-type magnetic field lines that surround the target.

According to a further aspect of the present invention, the neutron or gamma ray generating source aforementioned may be provided, wherein the magnet structure is formed as multiple couples of cylinders or rings while the target is aligned as a line or plate along the central axis of the magnet structure to produce multi-mode bridge-type magnetic field lines that surround the target.

According to an aspect of the present invention, a neutron or gamma ray generating method may be provided, the method comprising: mounting targets, onto which nuclear fusion elements have been adsorbed, in a plasma chamber; flowing gases containing nuclear fusion elements therein; forming a magnetic field to produce magnetic field lines that surround the target; and producing and forming plasma around the target inside the space in which the magnetic field is formed while causing a neutron or gamma ray to be emitted from the target by utilizing the plasma sheath, produced between the plasma and the target, for the ions to be accelerate.

According to another aspect of the present invention, a neutron or gamma ray generating method may be provided, wherein, for producing the plasma production, microwaves are irradiated into a space in which the magnetic field has been generated.

According to yet another aspect of the present invention, a neutron or gamma ray generating method may be provided, wherein bias voltage is applied to the target to accelerate the plasma to the target.

According to further another aspect of the present invention, a neutron or gamma ray generating method may be provided, wherein the plasma is produced in pulse mode while the bias voltage is applied to the target in pulse or DC, or the plasma is produced in continuous mode, not in pulse mode, while the bias voltage is applied to the target in pulse or DC.

According to an aspect of the present invention, a method to adsorb nuclear fusion reactant elements onto a target may be provided, the method included in a plasma nuclear fusion process, in which a target, onto which nuclear fusion reactant elements have been adsorbed, is mounted in a plasma chamber and gases containing nuclear fusion reactant elements are flowed in to produce plasma so that a neutron or gamma ray is generated, wherein a continuous nuclear fusion process that does not require additional target replacement may be allowed by adjusting bias voltage of the target for the nuclear fusion reactant elements to be adsorbed onto the target.

According to another aspect of the present invention, the method to adsorb nuclear fusion reactant elements onto a target may be provided, wherein DC voltage is selected as the target bias voltage of which value is lower than bias voltage that is applied when a neutron or gamma ray is generated by causing nuclear fusion reaction.

According to even further aspect of the present invention, the neutron or gamma ray generating method aforementioned may be provided, wherein, during the neutron or gamma ray generating process, a continuous nuclear fusion process that does not require additional target replacement may be allowed by rendering the target bias voltage lower than the bias voltage that is applied for generating neutron or gamma ray so that the nuclear fusion reactant elements may be adsorbed on the target.

According to another aspect of the present invention, the method to adsorb nuclear fusion reactant elements onto a target may be provided, wherein the target includes an internal space, and gases containing nuclear fusion reactant elements are confined in the internal space.

Advantageous Effects of Invention

According to exemplary embodiments of the present invention, plasma in a high density is generated in the vicinity of a target while a high ion flux is accelerated through plasma sheath produced between the plasma and the target and then collides with the target thereby providing energy high enough to trigger a nuclear fusion reaction so that a neutron and gamma ray in a high flux is generated. In addition, the plasma may be operated in either continuous or pulsed mode and the voltage that is applied to the target may be operated in either continuous or pulsed mode. Therefore, the operation manner that involves pulsed plasma plus pulsed target voltage may ultimately prolong the life of the target while maintaining the generation of a high neutron or gamma ray flux because, in that manner, the interaction time between the target and the plasma is minimized, which prevents the target from being excessively heated and further prevents the nuclear fusion reactant elements adsorbed onto the target form being evaporated. Furthermore, in a case in which any hollow target is employed, in which gases containing nuclear fusion reactant elements are confined, the nuclear fusion reaction may further activated as the target is heated, which is advantageous in that the target may be repetitively recycled.

According to exemplary embodiments of the present invention, the neutron or gamma ray generating source may be constructed, as necessary, in a plate for a large area, cylinder for portability, or the like, which facilitates various application.

DETAILED DESCRIPTION OF PREFERRED EMBODIMENTS

Preferred embodiments of the present invention will be described with reference to the accompanying drawings.

Figure 1:
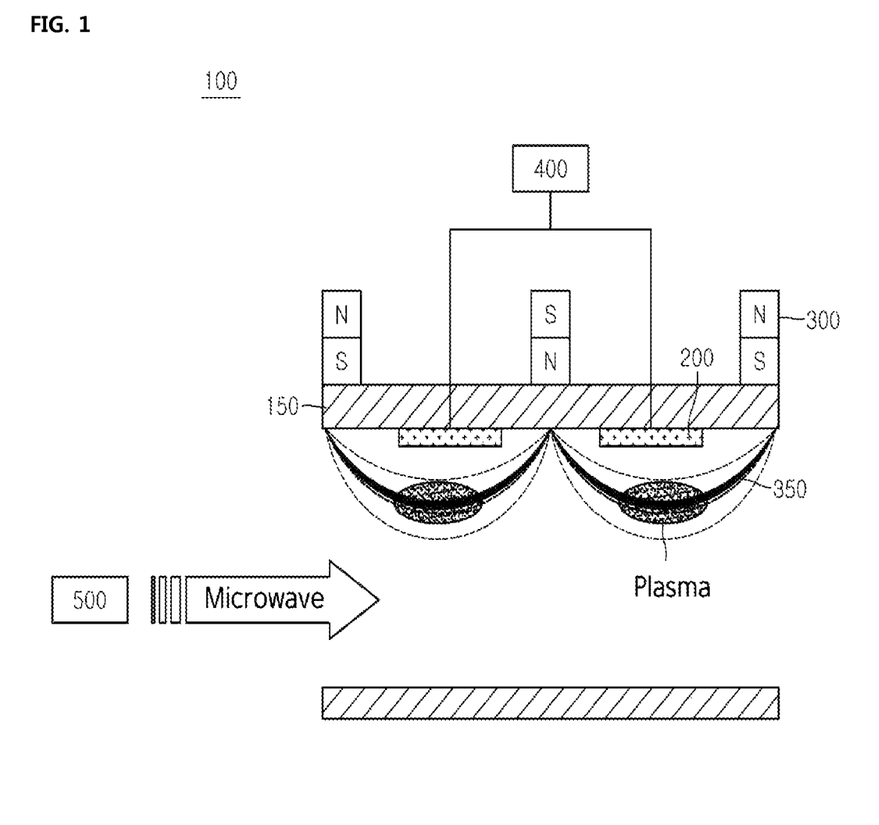
FIG. 1 is a cross-sectional view of a configuration of a lamellar neutron generating source according to an embodiment of the present invention.

FIG. 1, illustrating a first embodiment of the present invention, is a cross-sectional and top view of a plate type neutron generating source 100 that allows the area of a target 200 to be larger.

The target 200 onto which deuterium (D) or tritium (T) is adsorbed is attached on an internal surface of a side of a housing 150 that constitutes a plasma chamber while a magnetic structure 300 is mounted on an upper side of the target 200, that is, on an outside surface of the side of the housing 150 so as to generate a bridge-style magnetic field (magnetic field lines) with the target 200 as its center. Meanwhile, a microwave generator 500 as a plasma generating source is installed in the plasma chamber, gases containing D or T are flowed in, and a power supply 400, which applies bias voltage to the target 200 to direct the plasma produced by microwave irradiation to the target 200, is connected to the target 200.

The configuration as described above may have characteristics as follows.

Bridge-type magnetic field lines 350 that are generated as surrounding the target 200 confine the electrons and charged particles forming the plasma generated by the incident microwaves for producing the plasma inside the magnetic lines of force 350. Consequently, plasma in a high density exists in the vicinity of a surface of the target 200 and, when bias voltage is applied to the target, a high plasma ion flux accelerated via plasma sheath present between the plasma and the target collides with the target 200 to generate a high neutron flux. It is crucial to cause a plasma producing area by electron cyclotron resonance (ECR) heating to be formed in a magnetic field adjacent to the target in order for generating plasma in a high density in the vicinity of a target. This contrasts with a fact in the conventional neutron generating source that the neutron generating source forms a magnetic field adjacent to a target just in order to return secondary electrons generated on the target surface to the target surface while no plasma is generated in the magnetic field in the vicinity of the target so that the magnetic field surrounding the target prohibits the plasma formed on the opposite side to the target relative to the magnetic field, that is, outside the magnetic field from moving, by diffusion, to the target surface, thereby resulting in a lower density of the plasma in the vicinity of the target, which consequently produces a small amount of neutrons.

In addition, the configuration of this embodiment is also advantageous in that it prevents the target 200 from being excessively heated because, by using microwaves as a plasma source, it generates pulsed mode ECR plasma in the vicinity of (just over) the target and applies pulsed voltage to the target 200, which sufficiently reduces the average power applied to the target 200. If the target is excessively heated, the elements for generating radiation particles, such as D or T, adsorbed onto the target may evaporate, which lowers the generation density of such radiation particles. The present invention may avoid excessive heating of the target surface by generating pulse mode plasma and at the same time applying pulsed voltage to the target, which contrasts with the fact in the conventional techniques, that the plasma continues to persist thereby inevitably heating the target surface even with the help of cooling the target.

In addition, the configuration illustrated in FIG. 1 employs the plate type target 200 thereby rendering the target area a certain amount to be desired. Consequently, it may construct a side of the housing 150 to be a plate shape and to have a large area and modify the location of the magnetic structure 300.

The cylindrical neutron generating source illustrated in FIG. 2 will be described below.

Figure 2:
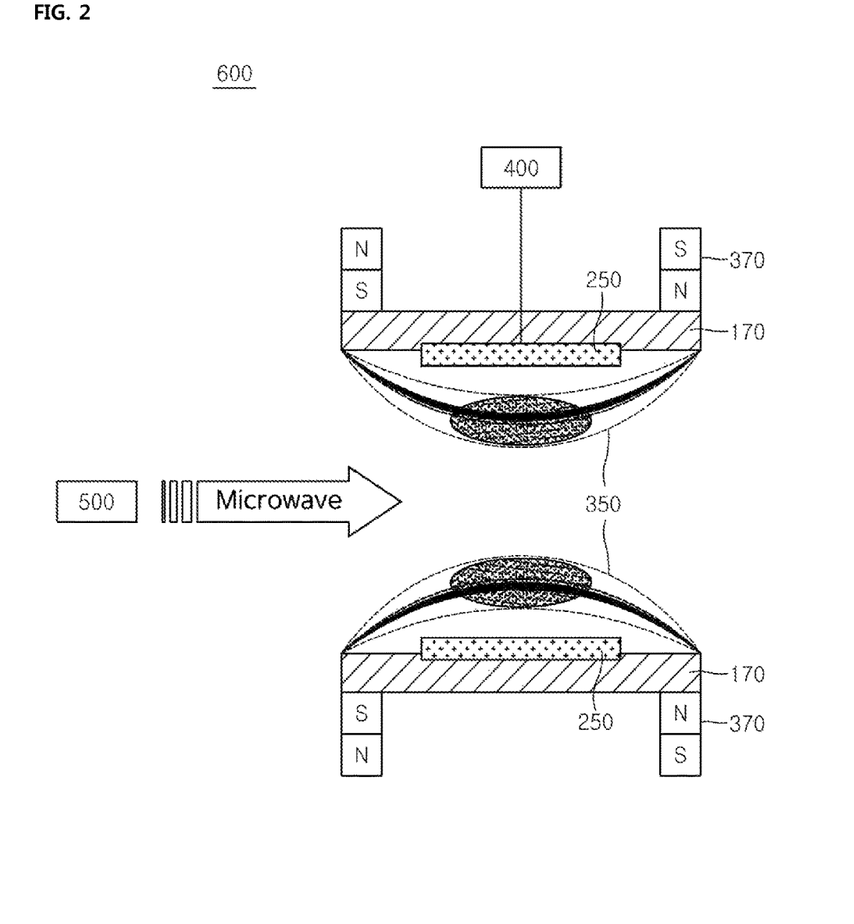
FIG. 2 is a cross-sectional view of a configuration of a cylindrical neutron generating source according to an embodiment of the present invention.

The embodiment illustrated in FIG. 2 is different from that illustrated in FIG. 1 in regard to the shape of a target 250 and a housing 170. In FIG. 2, the target 250 and the housing 170 are configured to be cylindrical and a magnetic structure 370 is also formed to be cylindrical or ring-shape and mounted to the external surface of the housing 170. A couple of the magnetic structures 370 are attached to form bridge-style magnetic field lines 350 with the above-described cylindrical target 250 as the center.

Also in the embodiment illustrated in FIG. 2 also employs a microwave generator 500 to produce plasma inside the magnetic field while connects a power supply 400 to the cylindrical target 250 to apply bias voltage in pulse mode. Principles that dominate the generation of a high neutron flux as per development of high density plasma and prevention of excessive heating of the target is equivalent to those in FIG. 1, however, a cylindrical neutron generating source 600 illustrated in FIG. 2 is advantageous in that it may be constructed to be portable of which the total volume is decreased. The cylindrical neutron generating source 600 is also advantageous in that it may contain the target 250 with a relatively large area despite its small total volume and generate a strong magnetic field all across the space in which the plasma is produced.

Figure 3:
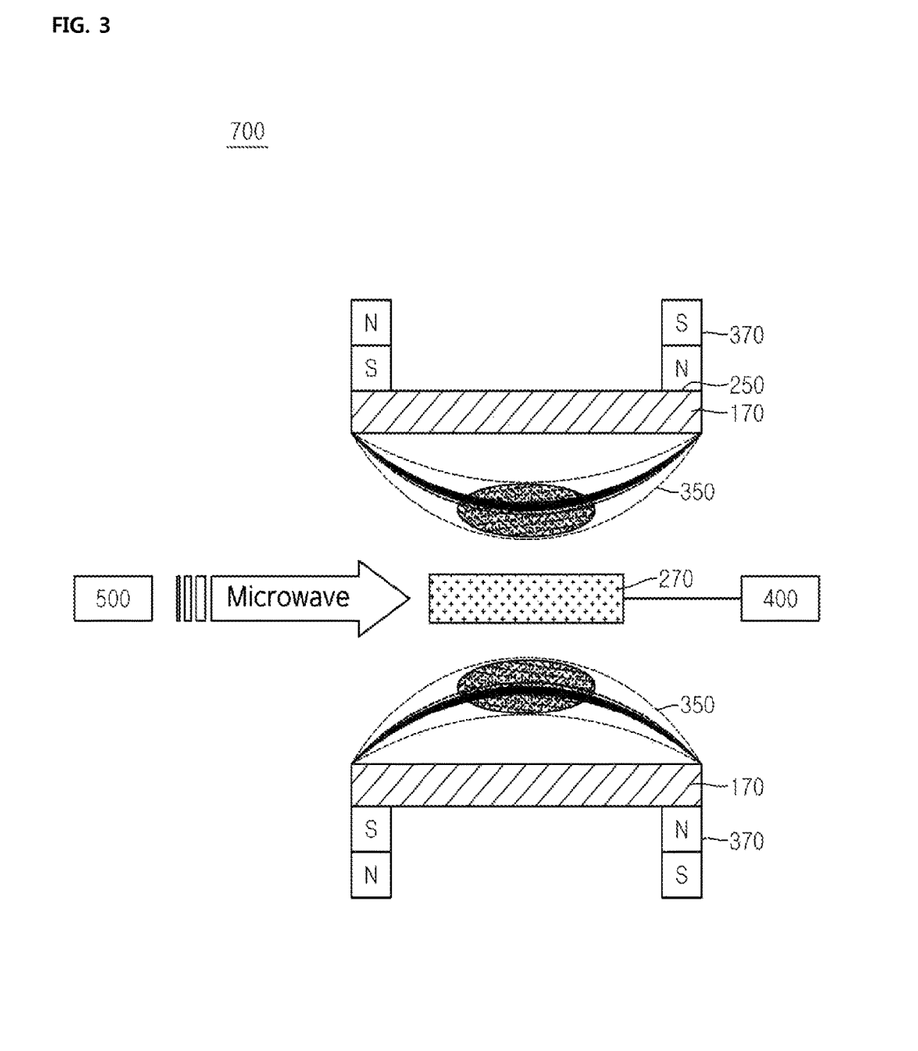
FIG. 3 is a cross-sectional view of a configuration of a linear neutron generating source according to an embodiment of the present invention.

Although FIG. 3 represents a cylindrical neutron generating source 700 that outwardly seems to be the same as that in FIG. 2, a target 270 installed therein is formed to be linear, different from that in FIG. 2. In other words, the linear target 270 is arranged along the central axis of a cylindrical housing 170 in this embodiment. A couple of magnetic structures 370, equivalent to those illustrated in FIG. 2, is mounted to the external wall of the cylindrical housing 170 so that bridge-style magnetic field lines 350 surround the target 270 in the space in which plasma has been generated.

The configuration illustrated in FIG. 3 is advantageous in that it facilitates the manufacturing and installation in terms of attachment and detachment of the target 270 and the reactive surface area relative to the target volume increases which promotes neutron emission because all the surface areas of the target 270 including the front and rear surface are collided with plasma. A plate type target 270, other than the linear one, may be manufactured, where the word "linear" means that it can be constructed in any shape, irrespective of its cross-section, that may be aligned along the central axis.

Figure 4:
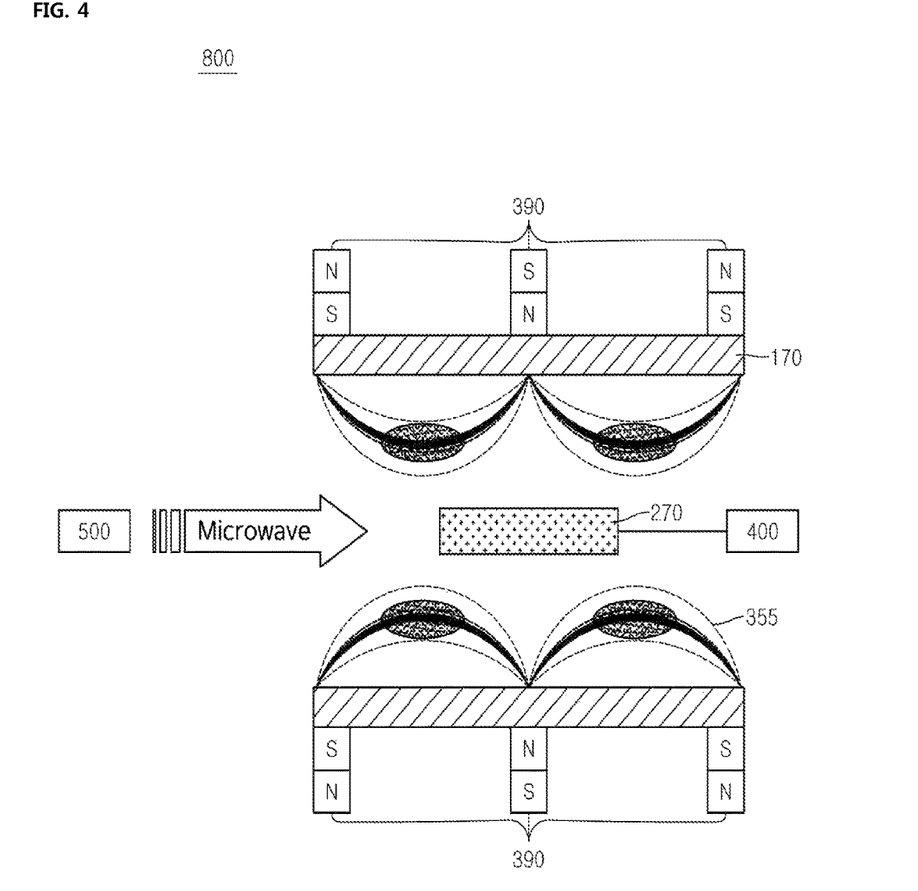
FIG. 4 is a cross-sectional view of a configuration of a cylindrical neutron generating source that utilizes a multimode magnetic field according to an embodiment of the present invention.

The configuration illustrated in FIG. 4 may be considered as a modified embodiment of the embodiment illustrated in FIG. 3. Although a configuration that a linear target 270 is aligned along the central axis of a cylindrical housing 170 is the same as FIG. 3, magnetic structures 390, attached on the outer surface of the housing 170, constitute multiple couples, not a single couple, different from FIG. 3 so as to produce magnetic field lines 355, formed inside the cylindrical housing 170, in multi-mode. Such magnetic fields in multi-mode multiply the distribution of the plasma, which consequently renders all the surfaces of the target 270 uniformly collided with the plasma.

The frequency of the microwaves employed in the above-described embodiments and the intensity of the magnetic field were 2.45 GHz and 875 gauss, respectively, but are not limited to the values. Any microwave of which frequency is higher than the ionic frequency of the plasma and any resonance magnetic field corresponding to such a microwave frequency may be used. Here, the ionic frequency of plasma $\Omega_i$ and the resonance magnetic field B are expressed by the following formulas:

$$\Omega_i = \sqrt{4\pi n_i Z^2 e^2 / m_i}$$

where,
$n_i$: density of the ion
Z: atomic number
e: electronic charge
$m_i$: mass of the ion $$B = 2\pi \frac{m_e}{e} j$$

where,
f: frequency of the microwave
e: electronic charge
$m_e$: mass of electron A neutron generating source capable of producing a high neutron flux may be manufactured in this way.

Meanwhile, it is necessary to replace all the targets irrespective of their shapes because, as a nuclear fusion reaction proceeds, the nuclear fusion reactant elements adsorbed onto the target become depleted. However, to eliminate any inefficiency of ceasing the reaction and breaking vacuum for, the embodiments according to the present invention employ a following method to adsorb nuclear fusion elements onto a target.

If the bias voltage applied to the target is significantly lowered than the bias voltage to trigger a nuclear fusion reaction, the nuclear fusion reaction is ceased and the plasma ions collide with the target with an impact less than that at the time of the nuclear fusion reaction, thereby adsorbing the ions derived from the nuclear fusion elements contained in the plasma onto the target. In this manner, the reaction is continuously processed without target replacement.

This method, which accounts for a target recycling method, according to the present invention may counter all the drawbacks of the conventional technique including process cessation due to target replacement and additional expenses and environmental impacts due to the entire disposal, without any recycling, of targets that have depleted all the elements adsorbed thereto.

In the case of the bias voltage, although the peak pulse for a nuclear fusion reaction is about a few hundreds kV, a DC voltage less than a few hundreds V is high enough to adsorb nuclear fusion elements onto a target, inter alia, a few decades of voltage region is efficient.

The present invention configures a hot target that is differentiated from the conventional technique.

In other words, in the conventional target, when causing a nuclear fusion reaction using plasma, a continuous cooling of the target is required because the nuclear fusion reactant elements adsorbed in the target are depleted out of the target as the target is heated as the process proceeds. Such a cold target has a very short life, which consequently hinders the persistence of the nuclear fusion reaction process.

To overcome the problem aforementioned, the embodiments according to the present invention provide an improved shape of a target that has a hollow space therein. Gases containing nuclear fusion reactant elements are flowed into and maintained in the space, thereby not cooling the target. In such a hot target configuration, the heat generated from the target activates the diffusion via which the gas that is confined in the internal space of the target and contains the nuclear fusion reactant elements is adsorbed to the target body, thereby persistently facilitating neutron or gamma ray generation by plasma ions that act on the target surface. That is, the reaction persists and the target life extends because the adsorption of the nuclear fusion element-containing gas starts from the internal space of the target and diffuses towards the surface of the target while the neutron or gamma ray generation via collision of plasma ions with the target occurs on the outer surface of the target. This configuration that involves a hollow target is also advantageous in the above-described embodiments in which the target is not excessively heated.

Figure 5:
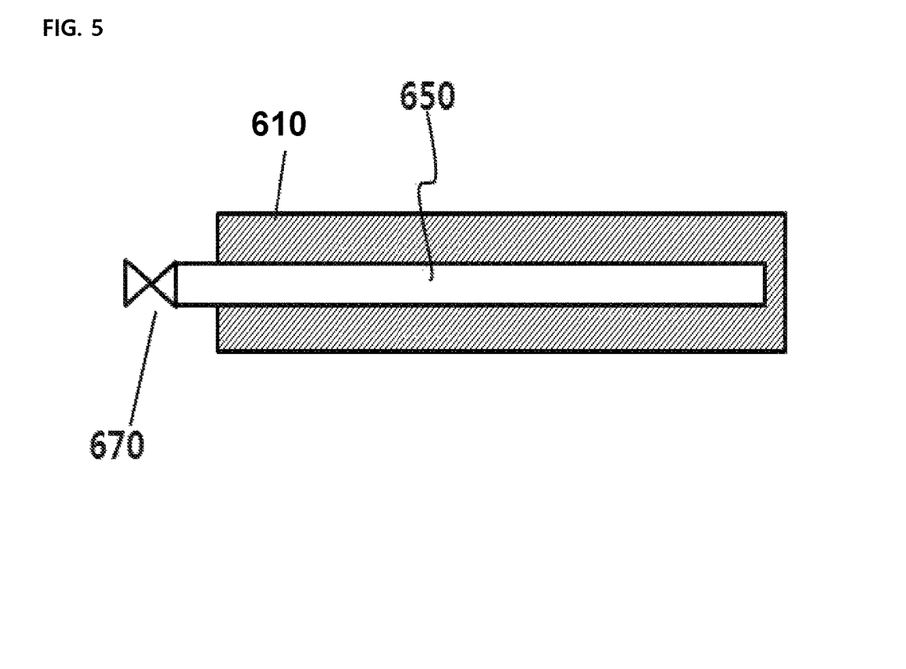
FIG. 5 is a cross-sectional view of an example of a hollow target according to an embodiment of the present invention.

FIG. 5 is a cross-sectional view of an example of a hollow target 610 according to an embodiment of the present invention. Although the configuration aforementioned may include very diverse shapes, inter alia, a cylindrical hollow target, a planar hollow target, a track-like hollow target, or the like, it is desirable to have a configuration which enables injection of gases containing nuclear fusion elements into a hollow target 610 provided with a cavity 650 therein and open or close an opening of the internal cavity with a valve 670 so that the gas may be recharged. That is, the opening of the internal cavity is sealed (via welding, adhesion, or the like) with a lid including a valve, of which material, such as stainless steel, may be selected taking into consideration of the process temperature and durability.

When considering the fact that the target is manufactured out of metallic materials such as Ti (but not limited thereto), since its melting point is over 1,000° C., a reaction may persist even the process temperature is at a few hundreds ° C. without any necessity of cooling the target.

The description thus far is nothing more than an exemplification of the technical thoughts of this invention and a person skilled in the art to which this invention belongs may, not deviating from the scope of the essential features of this invention, amend and modify this example. In this perspective, the preferred embodiments demonstrated in this invention are not to restrict but to expound the technical thoughts of this invention while the scope of the technical thoughts of this invention shall not restricted within such examples. The scope of the protection for this invention should be interpreted based on the claims as follows and all the technical thoughts in the scope equivalent to that of those Claims should be comprehended to be included in the scope of the rights of this invention.

INDUSTRIAL APPLICABILITY

Neutron or gamma ray generating techniques according to the present invention may be widely utilized in nuclear material detection, oil layer exploration, material structure research, medicine study, or the like.

What is claimed is:

1. A neutron generating device, comprising:
   a plasma generating chamber;
   a target disposed in the chamber, neutron generating elements being adsorbed onto the target;
   a magnet structure disposed around the target generating a magnetic field around the target;
   a microwave generator for emitting microwaves into a space where the magnetic field is generated; and
   a power supply for applying a bias voltage to the target,
   wherein the target has a shape of a cylinder and wherein the magnet structure is formed as coupled cylinders or rings that surround a portion of the target from an outside of the target and produces bridge-type magnetic field lines around the target,
   and wherein plasma is generated by the microwaves from the microwave generator and wherein electrons and charged particles in the plasma are accelerated toward the target by the bias voltage applied by the power supply and collide with the neutron generating elements on the target to generate a neutron flux.

2. The neutron generating device of claim 1, wherein the microwave generator irradiates pulsed microwaves into the plasma generating chamber to generate plasma in a pulsed mode.

3. The neutron generating device of claim 1, wherein the bias voltage is applied to the target in a pulsed mode.

4. The neutron generating device of claim 2, wherein the bias voltage is applied to the target in a pulsed mode.

5. The neutron generating device of claim 1, wherein the magnet structure is formed as coupled cylinders or rings and wherein the target is aligned as a line or plate along a central axis of the magnet structure to produce bridge-type magnetic field lines that surround the target.

6. The neutron generating device of claim 2, wherein the magnet structure is formed as coupled cylinders or rings and wherein the target is aligned as a line or plate along a central axis of the magnet structure to produce bridge-type magnetic field lines that surround the target.

7. The neutron generating device of claim 5, wherein the bias voltage is applied to the target in a pulsed mode.

8. The neutron generating device of claim 6, wherein the bias voltage is applied to the target in a pulsed mode.

9. The neutron generating device of claim 5, wherein the magnet structure is formed as multiple couples of cylinders or rings and wherein the target is aligned as a line or plate along a central axis of the magnet structure to produce multi-mode bridge-type magnetic field lines that surround the target.

10. The neutron generating device of claim 6, wherein the magnet structure is formed as multiple couples of cylinders or rings and wherein the target is aligned as a line or plate along a central axis of the magnet structure to produce multi-mode bridge-type magnetic field lines that surround the target.

11. The neutron generating device of claim 10, wherein the bias voltage is applied to the target in a pulsed mode.

12. The neutron generating device of claim 1, wherein the target includes an internal space, and gases containing nuclear fusion reactant elements that include at least one of deuterium or tritium are filled in the internal space.

13. The neutron generating device of claim 2, wherein the target includes an internal space, and gases containing nuclear fusion reactant elements that include at least one of deuterium or tritium are filled in the internal space.

14. A gamma ray generating source, comprising:
   a plasma generating chamber;
   a target mounted inside the chamber, gamma ray generating elements being adsorbed onto the target;
   a magnet structure installed around the target and generating a magnetic field around the target;
   a microwave generator that irradiates microwaves into a space in which the magnetic field is generated; and
   a power supply that applies a bias voltage to the target,
   wherein the target has a shape of a plate and wherein the magnet structure includes an array of multiple magnets mounted on an upper side of the target and produces bridge-type magnetic field lines surrounding the target,
   and wherein plasma is generated by microwaves from the microwave generator and wherein electrons and charged particles in the plasma are accelerated toward the target by the bias voltage applied by the power supply and collide with the gamma ray generating elements on the target to generate a gamma ray flux.

15. The gamma ray generating source of claim 14, wherein the bias voltage to the target is applied in a pulsed mode.

16. A neutron generating source, comprising:
   a plasma generating chamber;
   a target mounted inside the chamber, neutron generating elements being adsorbed onto the target;
   a magnet structure installed around the target and generating a magnetic field around the target;
   a microwave generator that irradiates microwaves into a space in which the magnetic field is generated; and
   a power supply that applies a bias voltage to the target,
   wherein the target has a shape of a cylinder and wherein the magnet structure is formed as coupled cylinders or rings that surround the target from an outside of the target and produces bridge type magnetic field lines around the target,
   and wherein plasma is generated by microwaves from the microwave generator and wherein electrons and charged particles in the plasma are accelerated toward the target by the bias voltage applied by the power supply and collide with the neutron generating elements on the target to generate a neutron flux.

17. The neutron generating device of claim 16, wherein the bias voltage is applied to the target in a pulsed mode.

* * * * *